United States Patent
Raj et al.

(10) Patent No.: US 10,958,539 B1
(45) Date of Patent: Mar. 23, 2021

(54) NETWORK FUNCTION VIRTUALIZATION COMPUTE ELEMENT IMAGE UPGRADE

(71) Applicant: Cisco Technology, Inc., San Jose, CA (US)

(72) Inventors: Anantha Mohan Raj, Bangalore (IN); Sachin Soman, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/700,718

(22) Filed: Dec. 2, 2019

(51) Int. Cl.
*G06F 9/455* (2018.01)
*H04L 12/24* (2006.01)
*H04L 29/06* (2006.01)
*H04L 12/715* (2013.01)
*H04L 12/725* (2013.01)

(52) U.S. Cl.
CPC ...... *H04L 41/5041* (2013.01); *G06F 9/45558* (2013.01); *H04L 41/20* (2013.01); *H04L 45/306* (2013.01); *H04L 45/64* (2013.01); *H04L 63/0428* (2013.01); *H04L 63/0823* (2013.01); *H04L 63/20* (2013.01); *H04L 69/163* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,360,072 | B1* | 4/2008 | Soltis | G06F 9/4416 709/222 |
| 2008/0163208 | A1* | 7/2008 | Burr | G06F 9/45558 718/1 |
| 2009/0290501 | A1* | 11/2009 | Levy | H04L 49/70 370/250 |

(Continued)

OTHER PUBLICATIONS

Watsen, "NETCONF Call Home and RESTCONF Call Home", Internet Engineering Task Force (IETF), Standards Track, ISSN: 2070-1721, Feb. 2017, 13 pages.

(Continued)

*Primary Examiner* — James A Edwards
(74) *Attorney, Agent, or Firm* — Johnson, Marcou, Isaacs & Nix, LLC

(57) ABSTRACT

A network function virtualization (NFV) compute element installs an image supporting a virtualized network function (VNF) on the element. The image includes instructions/data to initiate a TCP connection between the element and a Software Defined Network (SDN) controller upon reboot of the element. Upon rebooting, the element establishes, as client in accordance with the instructions/data, a TCP connection with the controller. The element then accepts, as a cryptographic network protocol server, a connection via the TCP connection from the controller as a client in accordance with the instructions. Next, the element accepts, as a network management protocol server, a connection via the cryptographic network protocol connection from the controller as network management protocol client. The element receives, from the controller over the network management (Continued)

protocol connection, commands regarding the status of the rebooted compute element, and then transmits, to the controller over the network management protocol connection, responses to the commands.

20 Claims, 7 Drawing Sheets

(56) References Cited

U.S. PATENT DOCUMENTS

| | | | |
|---|---|---|---|
| 2017/0019386 A1* | 1/2017 | Ylonen | G06F 21/575 |
| 2017/0026283 A1* | 1/2017 | Williams | H04L 45/74 |
| 2017/0230257 A1* | 8/2017 | Bruun | H04L 41/5054 |
| 2019/0089748 A1* | 3/2019 | Manor | H04L 63/1441 |
| 2019/0116535 A1* | 4/2019 | Szilagyi | H04L 43/0864 |
| 2019/0349284 A1* | 11/2019 | Menon | H04L 69/163 |
| 2020/0213191 A1* | 7/2020 | Watsen | H04L 9/30 |

OTHER PUBLICATIONS

Ylonen, et al., "The Secure Shell (SSH) Connection Protocol", Network Working Group, RFC-4254, Standards Track, Jan. 2006, 1-24.

* cited by examiner

400

```
┌─────────────────────────────────────────────────────────────────────────┐
│ Installing an image supporting at least one virtualized network function│
│ on a compute element, the image comprising instructions and data to     │
│ initiate a Transmission Control Protocol (TCP) connection between the   │
│ compute element and a Software Defined Network (SDN) controller over a  │
│ network upon a restart of the compute element                           │
│                                   410                                   │
└─────────────────────────────────────────────────────────────────────────┘
                                    ↓
┌─────────────────────────────────────────────────────────────────────────┐
│              Rebooting the compute element after the installing         │
│                                   420                                   │
└─────────────────────────────────────────────────────────────────────────┘
                                    ↓
┌─────────────────────────────────────────────────────────────────────────┐
│ Establishing, by the re-booted compute element as TCP client in         │
│ accordance with the instructions and using the data, a TCP connection   │
│ with the controller over the network                                    │
│                                   430                                   │
└─────────────────────────────────────────────────────────────────────────┘
                                    ↓
┌─────────────────────────────────────────────────────────────────────────┐
│ Accepting, by the compute element as a cryptographic network protocol   │
│ server, a cryptographic network protocol connection via the TCP         │
│ connection from the controller as a cryptographic network protocol      │
│ client in accordance with the instructions                              │
│                                   440                                   │
└─────────────────────────────────────────────────────────────────────────┘
                                    ↓
┌─────────────────────────────────────────────────────────────────────────┐
│ Accepting, by the compute element as a network management protocol      │
│ server, a network management protocol connection via the cryptographic  │
│ network protocol connection from the controller as a client in          │
│ accordance with the instructions                                        │
│                                   450                                   │
└─────────────────────────────────────────────────────────────────────────┘
                                    ↓
┌─────────────────────────────────────────────────────────────────────────┐
│ Receiving, by the compute element from the controller over the network  │
│ management protocol connection, network management commands regarding   │
│ the status of the rebooted compute element                              │
│                                   460                                   │
└─────────────────────────────────────────────────────────────────────────┘
                                    ↓
┌─────────────────────────────────────────────────────────────────────────┐
│ Transmitting, by the compute element to the controller over the network │
│ management protocol connection, responses to the received commands in   │
│ accordance with the instructions                                        │
│                                   470                                   │
└─────────────────────────────────────────────────────────────────────────┘
```

Establishing, by the re-booted compute element as TCP client in accordance with the instructions and using the data, a TCP connection with the controller over the network
430

---

Accepting, by the compute element as a cryptographic network protocol server, a cryptographic network protocol connection via the TCP connection from the controller as a cryptographic network protocol client in accordance with the instructions
440

Transmitting, by the rebooted compute element to the controller, a public key certificate of the rebooted compute element including an IP address of the compute element, and wherein at least one of the TCP connection, the cryptographic protocol connection, and the network management protocol connection are conditioned on the authentication of the rebooted compute element by the controller based on the public key certificate.
540

---

Accepting, by the compute element as a network management protocol server, a network management protocol connection via the cryptographic network protocol connection from the controller as network management protocol client in accordance with the instructions
450

NETWORK FUNCTION VIRTUALIZATION COMPUTE ELEMENT IMAGE UPGRADE

TECHNICAL FIELD

The disclosed technology relates to computer network operation. Particular examples disclosed herein relate to managing compute element images that support network function virtualization (NFV) capabilities on compute elements in software defined networks.

BACKGROUND

Referring to FIG. 1, a packet switched computer networking architecture 100 is illustrated. In a typical computer network, a network node is either data communication equipment (DCE) 110 or data terminal equipment (DTE) 120. Example DCEs 110 include, but are not limited to, routers, switches, and bridges. Example DTEs 120 include, but are not limited to, host computers and peripherals, such as printers. In a network, nodes are connected by a transmission medium, such as wired or wireless, and other elements of a communications network 99.

Packet switched computer network operation across DCEs 110 can be described as occurring across three "planes"—the data plane 112, the control plane 114, and the management plane 116. The data plane 112, also referred to as the "forwarding plane," is responsible for the actual switching/forwarding of packets over the network by a DCE 110 to either another DCE 110 or a DTE 120 based on a forwarding information base (FIB). The control plane 114 is responsible for i) defining the network topology and the network routing protocols, and ii) building/maintaining the FIB in accordance with the topology and routing protocols. The management plane 116 is responsible for both user and programmatic interfaces to the control plane 114 along with other network housekeeping tasks. Typically, each of both data plane 112 functions and control plane 114 functions are tightly coupled to the DCEs 110.

BRIEF DESCRIPTION OF THE DRAWINGS

FIG. 4 is a block flow diagram depicting methods to upgrade images on compute elements that support NFV, in accordance with certain examples of the technology disclosed herein.

FIG. 5 is a block flow diagram depicting methods to upgrade images on compute elements that support NFV, in accordance with certain examples of the technology disclosed herein.

DETAILED DESCRIPTION OF EXAMPLE EMBODIMENTS

Figure 1:
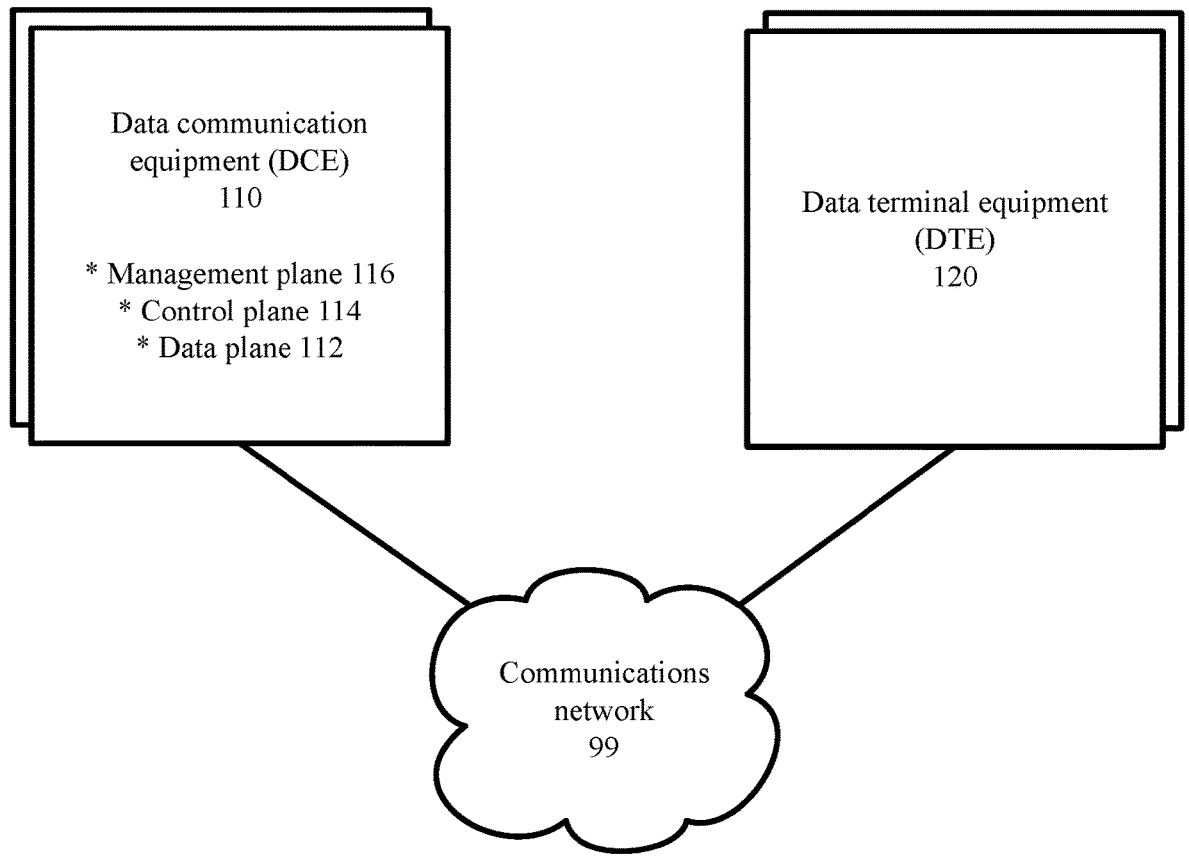
FIG. 1 is a block diagram depicting a packet switched computer networking architecture.
Figure 2:
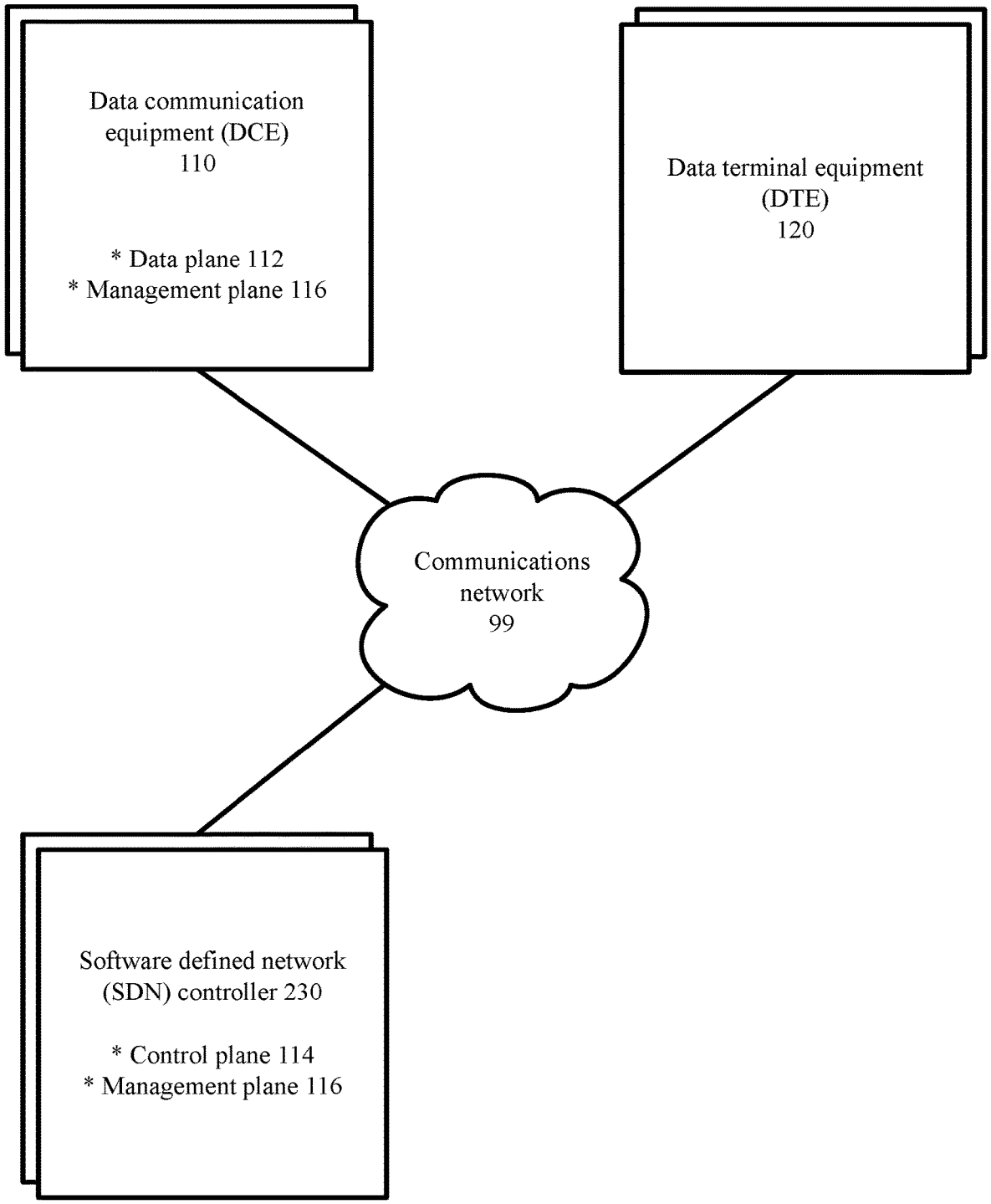
FIG. 2 is a block diagram depicting a software defined network (SDN) architecture.

Referring to FIG. 2, and continuing to refer to FIG. 1 for context, a software defined network (SDN) architecture 200 is illustrated. In an SDN, control plane 114 functions can be separated from data plane functions 112 and hosted in one or more SDN "controllers" 230 outside the data communication equipment (DCEs) 110—thus decoupling the control plane from the DCEs 110 and from the data plane 112. For simplicity, the remainder of the disclosure will not explicitly discuss the management plane 116.

Figure 3:
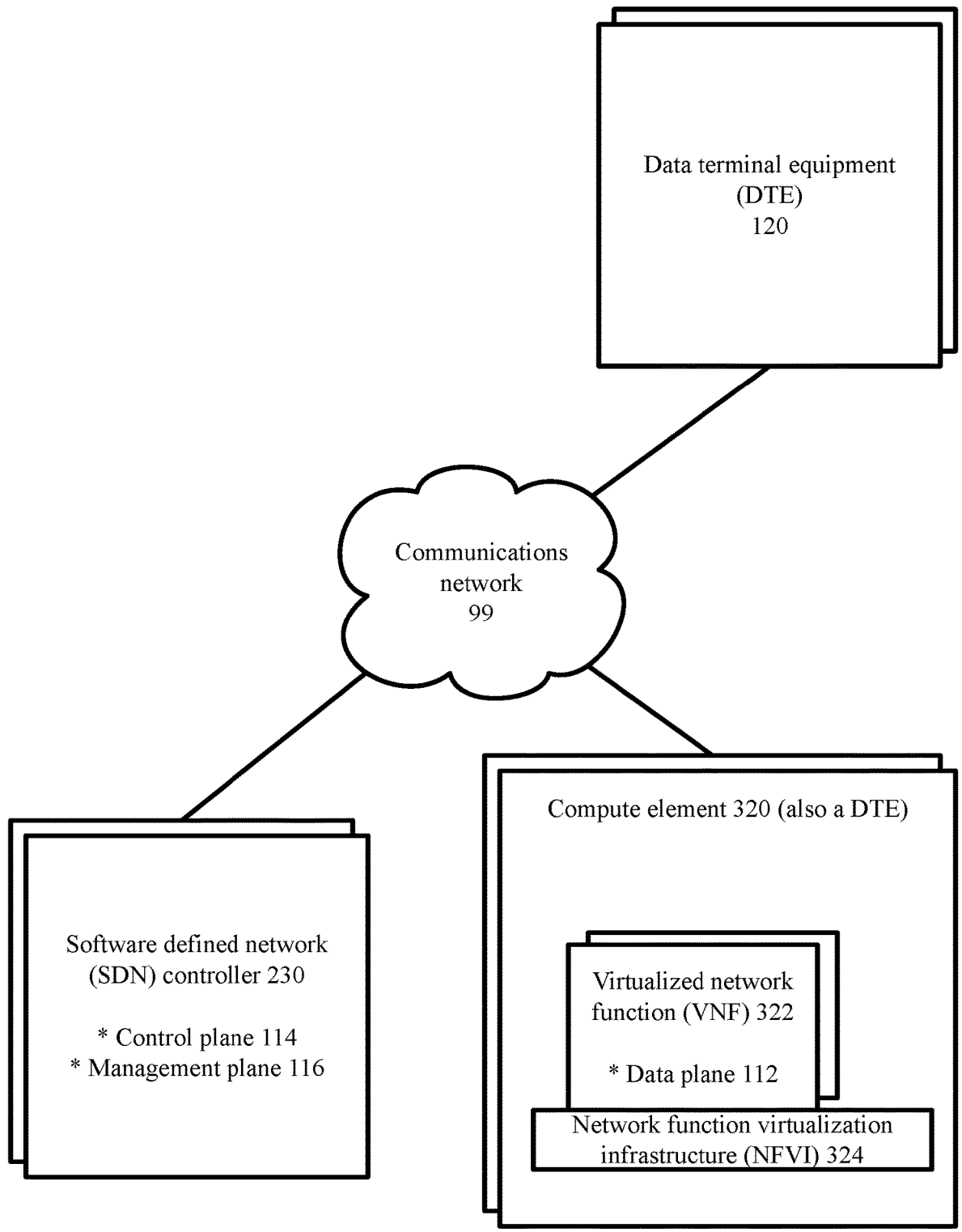
FIG. 3 is a block diagram depicting an SDN architecture with network function virtualization (NFV), in which the technology disclosed herein operates.

Referring to FIG. 3, and continuing to refer to prior figures for context, an architecture 300 for an SDN employing network function virtualization (NFV) is illustrated. Similar to the manner in which the evolution from architecture 100 to an SDN 200 decouples the control plane 114 from the DCEs 110 and the data plane 112, an SDN 200 employing NFV as in architecture 300 decouples the data plane 112 from DCE 110 hardware—allowing general purpose compute elements 320 (including some DCEs 120) to host virtual network functions (VNFs) 322. NFV uses the approaches of information technology virtualization, such as hypervisors in a network function virtualization infrastructure (NFVI) 324, to virtualize classes of DCE 110 functions into building blocks that may connect, or chain together, to create communication services.

In a typical SDN/NFV environment 300 a need often exists to change the compute element 320 image (the collection of files and data that, when installed, implement the NFV infrastructure) from one version to another—or merely to install such an image on a compute element 320. Such image upgrade often involves a reboot/restart (hereinafter "reboot") to the compute element 320 for the changes to take effect. Additionally, the SDN controller 230 has the responsibility to check the status of the image upgrade by connecting to the compute element 320.

In a typical SDN/NFV environment 300, the controller 230 imports an image to an image management service that is part of, or managed by, the controller 230. The image management service distributes archived versions of the image, for example, "*.tar.gz" or "qcow2" archives, to the compute elements 320. The controller 230 then activates the distributed archives by executing a set of configuration commands on the compute element 320 that does the installation of the image on the compute element 320. On its own schedule, the compute element 320 typically reboots after installation of the image; while independently the controller 230 begins polling the compute element 320 at some time after the activation, for example, using the PING command. Once the compute element 320 finishes rebooting and responds to the PING command from the controller 230 (thereby confirming the reachability of the rebooted compute element with respect to the controller 230, the controller 230 can issue command line interface (CLI) commands (as a CLI client) to the compute element 320 (as a CLI server) to determine the status of the upgrade.

There are several drawbacks to the above approach to managing image upgrades on SDN/NFV compute elements 320. First, the compute element 320 may take considerable time to reboot after an image installation—requiring that the controller 230 employ a properly-tested and synchronized timeout and retry mechanism.

Second, in the microservice environment employed by some controllers 230, certain microservices are designated to execute the CLI commands on the compute element 320. For example, a network programmer microservice can do a write on the compute element 320 and an inventory microservice can do a read on the compute element 320 to determine the image upgrade status. The controller 230 invokes multiple calls to such microservices. These calls can introduce non-trivial latency, especially at the scale of networks with many compute elements 320.

Third, some controllers 230 distribute their functionality across subsystems each dedicated to specific tasks. For example, image distribution may be handled by a subsystem of the controller 230 that is separate from the subsystem of the controller 230 responsible for monitoring VNFs 322. The polling logic that determines whether a compute element 320 device is up and running has to be duplicated across different subsystems that interact with the compute element 320 during the upgrade.

Fourth, the rebooted compute element 320 might obtain a new Internet Protocol (IP) address from a Dynamic Host Configuration Protocol (DHCP) server. In such cases, a controller 230 polling the compute element's 320 old IP address will report an upgrade failure.

Fifth, leaving a port open on the rebooted compute element 320 listening for controller 230 polling may present a security risk.

Sixth, the compute element 320 could be behind a firewall with respect to the controller 230—requiring approaches such as a change in firewall settings or the configuration of a virtual private network between the rebooted compute element 320 and the controller 230.

The technology disclosed herein provides computer-implemented methods, systems, and computer program products to manage compute element images that support virtual network functions (VNFs) on compute elements in software defined networks. In some examples, a network function virtualization (NFV) compute element installs an image supporting at least one VNF on the compute element. The image includes instructions and data to initiate a Transmission Control Protocol (TCP) connection between the compute element and a Software Defined Network (SDN) controller over a network upon a restart of the compute element.

Upon rebooting the compute element after the installation, the rebooted compute element establishes, as TCP client in accordance with the instructions and using the data, a TCP connection with the controller over the network. The compute element then accepts, as a cryptographic network protocol server, a cryptographic network protocol connection via the TCP connection from the controller as a cryptographic network protocol client in accordance with the instructions. Next, the compute element accepts, as a network management protocol server, a network management protocol connection via the cryptographic network protocol connection from the controller as network management protocol client in accordance with the instructions.

The compute element receives, from the controller over the network management protocol connection, network management commands regarding the status of the virtual network function, and then transmits, to the controller over the network management protocol connection, responses to the received commands in accordance with the instructions.

In some examples, the cryptographic network protocol is one of a Secure Shell (SSH) cryptographic network protocol or a Blocks Extensible Exchange Protocol (BEEP) compliant cryptographic network protocol.

In some examples, the network management protocol is a Network Configuration Protocol (NETCONF) network management protocol. In some such examples, the received network management commands include one or more commands to create a NETCONF remote procedure call (RPC) subscription for the controller with the compute element, and transmitting responses to the received commands includes transmitting responses in accordance with the RPC subscription.

In some examples, the controller is characterized by first Internet Protocol (IP) addresses for monitoring reachability of the compute element and a second IP address for image management and the data comprises the first IP address and the second IP address. In such examples, establishing a TCP connection includes establishing, by the rebooted compute element a first TCP connection to monitor reachability with the first IP address, and a second TCP connection to monitor image installation with the second IP address. In such examples, transmitting includes transmitting reachability responses to the first IP address, and transmitting image installation responses to the second IP address.

In some examples, the rebooted compute element also transmits, to the controller, a public key certificate of the rebooted compute element including an IP address of the compute element. In such examples, at least one of the TCP connection, the cryptographic protocol connection, and the network management protocol connection are conditioned on the authentication of the rebooted compute element by the controller based on the public key certificate.

By using and relying on the methods, systems, and computer program products described herein, the technology disclosed herein provides for management of compute element 320 images implementing network function virtualization. As such, the technologies described herein may be employed to determine whether an image installation on a compute element 320 was successfully completed.

These and other aspects, objects, features, and advantages of the example embodiments will become apparent to those having ordinary skill in the art upon consideration of the following detailed description of illustrated example embodiments. Turning now to the drawings, in which like numerals represent like (but not necessarily identical) elements throughout the figures, example embodiments are described in detail.

Example System Architectures

In example architectures for the technology, while some items (such as servers, systems, and devices) shown in the architecture may be represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

Referring again to FIG. 3, while each element shown in the architecture 300 may be represented by one instance of the element, multiple instances of each can be used. Further, while certain aspects of operation of the present technology are presented in examples related to FIG. 1 through FIG. 3 to facilitate enablement of the claimed invention, additional features of the present technology, also facilitating enablement of the claimed invention, are disclosed elsewhere herein.

Further network 99 includes one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

The network connections illustrated are examples and other approaches for establishing a communications link between the computers and devices can be used. Additionally, those having ordinary skill in the art and having the benefit of this disclosure will appreciate that the network devices illustrated in the figures may have any of several other suitable computer system configurations, and may not include all the components described above.

In example embodiments, the network computing devices, and any other computing machines associated with the technology presented herein, may be any type of computing machine such as, but not limited to, those discussed in more detail with respect to FIG. 9. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 9. The computing machines discussed herein may communicate with one another, as well as with other computing machines or communication systems over one or more networks, such as network 99. Each network may include various types of data or communications network, including any of the network technology discussed with respect to FIG. 9.

EXAMPLE EMBODIMENTS

The examples illustrated in the following figures are described hereinafter with respect to the components of the example operating environment and example architectures 100, 200, and 300 described elsewhere herein. The example embodiments may also be practiced with other systems and in other environments. The operations described with respect to the example processes can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 4, and continuing to refer to prior figures for context, a block flow diagram depicting methods 400 to upgrade network function virtualization (NFV) images on compute elements 320 is shown, in accordance with certain examples of the technology disclosed herein. In such methods, an NFV compute element 320 installs an image implementing at least the NFV infrastructure (NFVI) to support at least one virtualized network function (VNF) 322 on the compute element 320—Block 410. The image includes instructions and data (including a configuration file) to initiate an Internet protocol suite transport layer connection between the compute element 320 and its controller 230 over network 99 upon a reboot of the compute element 320.

Consider, as a continuing example, a Cisco Digital Network Architecture (DNA) Center (DNAC) as controller 230, with integrated SoftWare Image Management (SWIM). The DNAC 230 can be used to build a SDN hierarchy across sites, buildings, and floors; define device credentials, discover devices, import software images using SWIM functions (for example, tagging an existing image as "golden," or downloading an image from an online server or local host); and distribute the image to a compute element 320 for later or immediate activation in support of one or more VNFs 322. Upon activation the compute element 320 installs the image. After the image has been installed in the compute element 320, the compute element 320 reboots—Block 420.

From the perspective of the controller 230, after activation of the image on the compute element 320, the controller 230 listens for Internet Protocol suite transport layer connections on a port designated for such. In the continuing example, the Internet Protocol transport layer connection is a Transmission Control Protocol (TCP) connection and the port is 4334, corresponding to the NETwork CONFiguration (NETCONF) protocol "callhome" Secure Shell (SSH) port. TABLE 1 presents an example command string for opening such a port in the controller 230.

In other examples, the NETCONF callhome Transport Layer Security (TLS) port 4335 can be used. In yet other examples, the technology uses the REpresentational State Transfer (REST) CONFiguration (RESTCONF) callhome port 4336.

TABLE 1

```
try {
    callhomeSocket = newServerSocket(port);
    } catch(Exception ex) {
    System.out.println("callhomeSocket 0 failed: " + ex);
    }
while(true) {
try{
log.info("\n\nWaiting to accept connection from NFVIS device");
Socketsocket= callhomeSocket.accept( );
Log.info("Accepted connection from nfvis device: "+
socket.toString( ));
DeviceHandlerdeviceHandler= newDeviceHandler(socket, properties);
Thread thread= newThread(deviceHandler);
thread.start( );
} catch(Exception ex) {
System.out.println("accept( ) failed: "+ ex);
System.exit(-1);
}
}
```

In other examples, the NETCONF callhome Transport Layer Security (TLS) port 4335 can be used. In yet other examples, the technology uses the REpresentational State Transfer (REST) CONFiguration (RESTCONF) callhome port 4336.

The rebooted compute element 320, as an Internet protocol suite transport layer client, establishes an Internet protocol suite transport layer connection over the network 99 with the controller 230 in accordance with the instructions and using the data—Block 430. In the continuing example the compute element 320, on a successful reboot after image installation, initiates a TCP connection with the controller 230 via the controller's port 4334 using a daemon process and information from a configuration file—each of which is included in the image. The information can include the SWIM IP address (and other controller 230 IP addresses, for example, if the controller 230 distributes functions across multiple IP addresses) along with the compute element 320 credentials.

Once the TCP connection is established, the compute element 320 is reachable by the controller 230 over network 99. This portion of the technology differs from conventional operation in that the controller 230, not the compute element 320, is typically the "client" initiator of communication connections. In the continuing example, a NETCONF protocol approach is used not only in the Internet protocol suite transport layer, but also in the Internet protocol suite application layer as described below.

This approach has several advantages over the polling mechanism described above. For example, the controller 230 does not require a properly-tested and synchronized timeout and retry mechanism for polling each compute element 320, given that the compute element 320 is the TCP connection initiator. As another example, the controller 230 will not have to proliferate calls to microservices (which introduces latency and requires processing resources) in order to poll/ping possibly-rebooted compute elements 320. In controllers 230 with functionality distributed across different nodes or clusters, each of those clusters will not have to spend processing resources, memory resources, and bandwidth to initiate interaction with a potentially large number of rebooted compute elements 320. Further, each compute element 320 does not have to open a port to listen for polls/pings from the controller 230.

The compute element 320, as a cryptographic network protocol server, accepts a cryptographic network protocol connection via the established transport layer connection from the controller 230 as a cryptographic network protocol client in accordance with the instructions—Block 440. In the continuing example, the compute element 320 acts as a Secure Shell (SSH) server, and accepts an SSH connection initiated by the controller 230. SSH provides a secure channel over an unsecured network in a client-server architecture, connecting an SSH client application (in this case an application running on the controller 230) with an SSH server application running on the compute element 320. In some examples, the cryptographic network protocol is a Blocks Extensible Exchange Protocol (BEEP) compliant cryptographic network protocol.

Referring to FIG. 5, and continuing to refer to prior figures for context, a block flow diagram depicting methods 500 to upgrade images on compute elements 320 is shown, in accordance with certain examples of the technology disclosed herein. In such methods 500, as a part of establishing an SSH connection, Block 440, the compute element 320 sends its host key or certificate, for example, an X.509 public key certificate, to the controller 230—Block 540. In the continuing example, the controller 230 uses the certificate to validate the identity of the rebooted compute element 320. In some examples, the compute element 320 has been assigned a trusted key from the compute element 320 manufacturer that is common across a plurality of compute elements 320 and that can be verified by a third party certificate authority. In such cases controller 230 has to trust only a single certificate that validates the authenticity of the various compute elements 320. In some examples, the compute element 320, receives a new IP address upon reboot from a DHCP server. The new IP address can be incorporated into the compute element's 320 certificate, from which the controller 230 can extract the new IP address.

Establishing the SSH session can also include the authentication of the controller 230 credentials which the compute element 320 can read from a configuration file that was part of the image installation. The compute element 320 can implement a persistent SSH connection with the controller. As the connection initiator, the compute element 320 can actively test the aliveness of the established connection using a keep-alive mechanism.

Returning to FIG. 4, the compute element 320 accepts, as a network management protocol server, a network management protocol connection via the cryptographic network protocol connection from the controller 230 as network management protocol client in accordance with the instructions—Block 450. In the continuing example, the compute element 320 acts as a NETCONF server and accepts a NETCONF connection on top of the SSH connection from controller 230. NETCONF is a network management protocol that provides mechanisms to install, manipulate, and delete the configuration of network devices. NETCONF's operations are realized on top of a Remote Procedure Call (RPC) layer. The NETCONF protocol uses an Extensible Markup Language (XML) based data encoding for the configuration data as well as the protocol messages.

The compute element 320 receives, from the controller 230 over the network management protocol connection, network management commands regarding the status of the upgrade—Block 460. In the continuing example, the compute element 320 receives NETCONF instructions creating an RPC subscription that sends upgrade event reports from the compute element 320 to the controller 230 over the layered TCP/SSH/NETCONF connection. TABLE 2 illustrates a NETCONF command from the controller 230 to the compute element for creating such an RPC subscription. In some examples, using the NETCONF client session, the controller 230 can also use GET RPC calls instead of the notification to determine the status of the image upgrade.

TABLE 2

<create-subscription
xmlns='urn:ietf:params:xml:ns:netconf:notification:1.0'>
<stream>vmlcEvent</stream></create-subscription>

Figure 6:
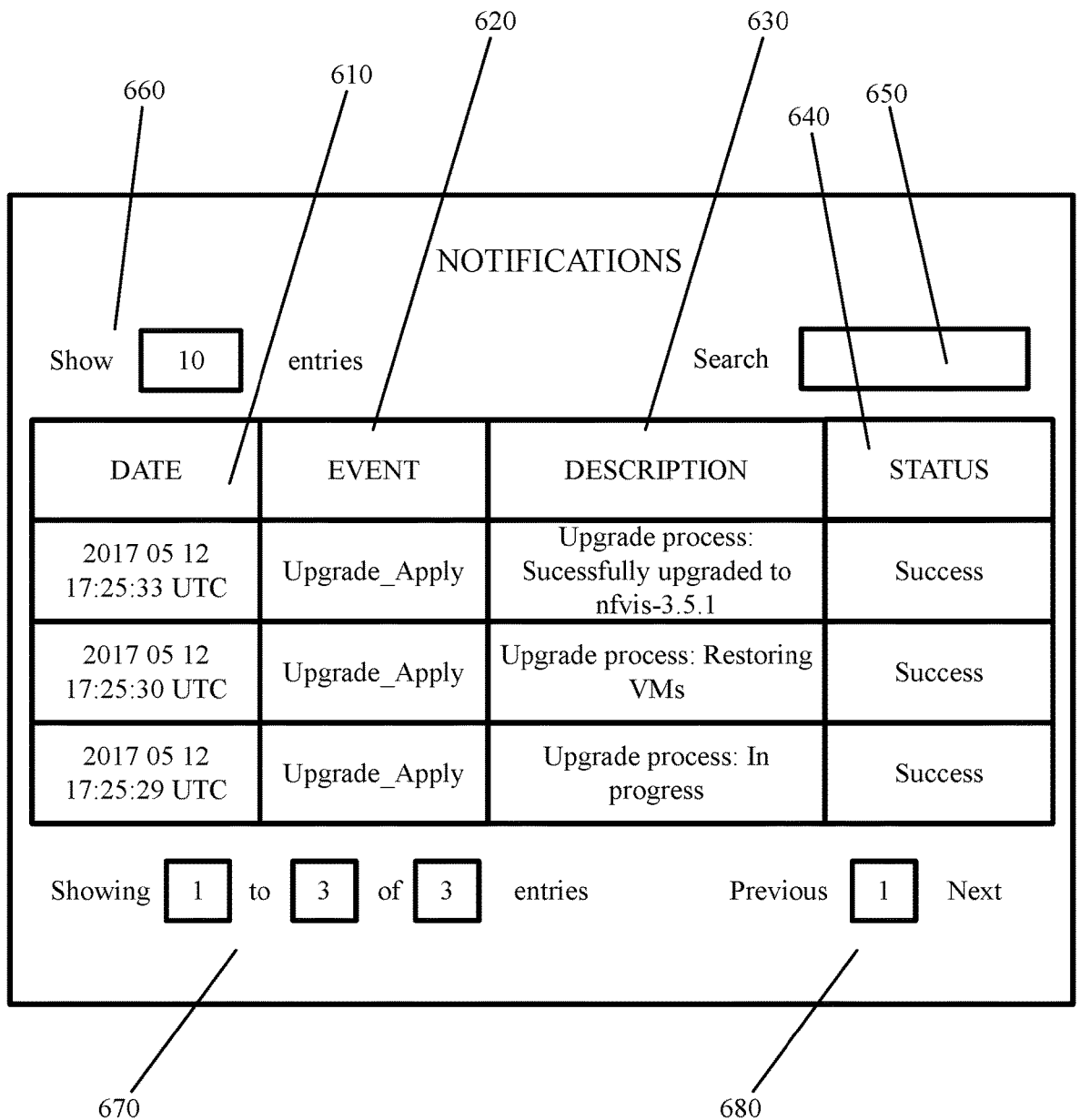
FIG. 6 is a user interface displaying events reported from a subscription in the compute element created by a command from the controller, in accordance with certain examples of the technology disclosed herein.

The compute element 320 transmits, to the controller 230 over the network management protocol connection, responses to the received commands in accordance with the instructions—Block 470. Referring to FIG. 6, and continuing to refer to prior figures for context, a user interface 600 of the controller 230 reporting events from the RPC subscription created by the command of TABLE 2 is shown, in accordance with certain examples of the technology disclosed herein. The user interface 600 includes a temporal indication 610, event type 620, event description 630, and event status 640 for each event, along with interface controls for search 650, the number of entries per page 660, which entries are being displayed 670, and page status/control 680. TABLE 3 presents example NETCONF syntax message from the compute element 320 to the controller 230 as a response indicating an "In process" upgrade—entry 690 in FIG. 6. Other event descriptions 630 include "restoring VMs" and "successfully upgraded."

TABLE 3

<?xml version="1.0" encoding="UTF-8"?>
<notification xmlns="urn:ietf:params:xml:ns:netconf:notification:1.0">
<eventTime>2017-04-26T16:02:43.885516+00:00</eventTime>
<nfvisEvent xmlns="http://www.cisco.com/nfvis/notifier">
<user_id>NA</user_id>
<config_change>true</config_change>
<transaction_id>0</transaction_id>
<status>SUCCESS</status>
<status_code>0</status_code>
<status_message>Upgrade Process: In Progress</status_message>
<event_type>UPGRADE_APPLY</event_type>
</nfvisEvent>
</notification>

OTHER EXAMPLE EMBODIMENTS

Figure 7:
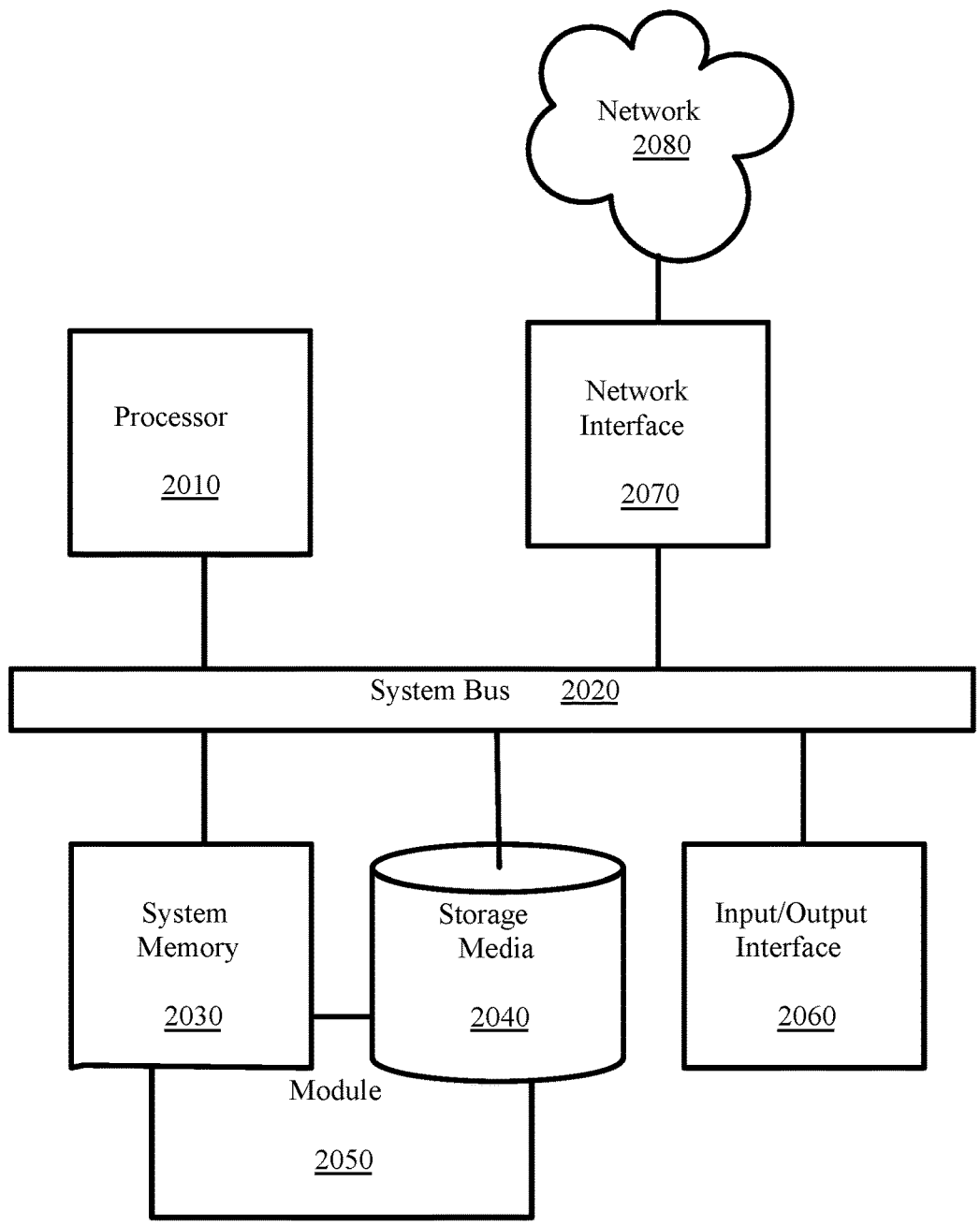
FIG. 7 is a diagram depicting a computing machine and a module, in accordance with certain example embodiments.

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), Fibre Channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

For example, in "high availability" (HA) scenarios the image management service portion of the controller 230 may have multiple instances which are load balanced with a HA proxy. The HA proxy address can be stored on the configuration file which the compute element 320 uses to initiate the transport layer connection. In such cases the notification is routed to one of the instances in the HA cluster.

As another example, through the use of keep-alive and retry-connection mechanism NETCONF connections can be persisted in case the controller 230 misses some transport layer connections so that the compute element 320 can retry the connection. This can help on a scale setup where the controller 230 manages many devices. In such cases it can listen for the appropriate port (4334 in the case of NETCONF) on all the controller 230 devices and can open NETCONF client session on each of the devices. If a device transport layer connection is missed, keep alive and retry mechanism at the compute element 320 side can be used to persist the connection and retry. If an active NETCONF session is disconnected due to some network connection issues the compute element 320 can restart the process by doing a keep alive check on the established connection.

In yet another example, the compute element image may implement operating system (OS) level virtualization in which the kernel allows the existence of multiple isolated user-space instances. OS-level virtualization is also known as "containerization." In another example, the technology can employ a transport layer protocol other than transport control protocol (TCP)—for example, user datagram protocol (UDP) employed with corresponding cryptographic network and network management protocols.

Network function virtualization can use virtualization technologies to virtualize physical network elements like routers and firewalls. A virtualized network function or VNF can include one or more virtual machines runs different network functions on top of an NFV compute device. Below is a step wise process of how to bring up a VNF on an NFV compute element.

Install a hypervisor (e.g. NFVIS, ESXi, openstack) on a standard X86 based compute servers. As part of this installation hypervisor software is installed on the compute element. The hypervisor helps to represent the hardware elements like storage, network and memory present on the compute machine. An NFV-Orchestrator that is typically part of the hypervisor software helps to orchestrate or create VNFs. Creating a VNF calls for an image, storage, CPU, network and memory—all can be created using the orchestrator. Once the image is uploaded in the compute device, NFV orchestrator will use that image and create a virtual machine with the given storage, CPU, network, and disk.

As we note here there are two images associated with NFV, one is the hypervisor software and the other is the image of the VNF. The image of hypervisor implements the new/upgraded capabilities to bring up a new VNF.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
    installing, by a network function virtualization compute element, an image supporting at least one virtualized network function on the compute element, the image comprising instructions and data to initiate a Transmission Control Protocol (TCP) connection between the compute element and a Software Defined Network (SDN) controller over a network upon a reboot of the compute element;
    rebooting the compute element after the installing;
    establishing, by the rebooted compute element as a TCP client in accordance with the instructions and using the data, a TCP connection with the controller over the network;
    accepting, by the compute element as a cryptographic network protocol server, a cryptographic network protocol connection via the TCP connection from the controller as a cryptographic network protocol client in accordance with the instructions;
    accepting, by the compute element as a network management protocol server, a network management protocol connection via the cryptographic network protocol connection from the controller as a network management protocol client in accordance with the instructions;
    receiving, by the compute element from the controller over the network management protocol connection, network management commands regarding a status of the rebooted compute element; and
    transmitting, by the compute element to the controller over the network management protocol connection, responses to the received commands in accordance with the instructions.

2. The method of claim 1, wherein the cryptographic network protocol is a Secure Shell (SSH) cryptographic network protocol.

3. The method of claim 1, wherein the cryptographic network protocol is a Blocks Extensible Exchange Protocol (BEEP) compliant cryptographic network protocol.

4. The method of claim 1, wherein the network management protocol is a Network Configuration Protocol (NETCONF) network management protocol.

5. The method of claim 4, wherein:
    the received network management commands comprise a command to create a NETCONF remote procedure call (RPC) subscription for the controller with the compute element, and
    transmitting responses to the received commands comprises transmitting responses in accordance with the RPC subscription.

6. The method of claim 1, wherein at least one response to the received commands indicates at least one of: an upgrade in progress, restoration of at least one virtual machine in progress, and a completed upgrade.

7. The method of claim 1, further comprising:
    transmitting, by the rebooted compute element to the controller, a public key certificate of the rebooted compute element including an IP address of the compute element, and
    wherein at least one of the TCP connection, the cryptographic protocol connection, and the network management protocol connection are conditioned on an authentication of the rebooted compute element by the controller based on the public key certificate.

8. A computer program product, comprising:
    a non-transitory computer-readable storage device having computer-executable program instructions embodied thereon that when executed by a computer cause the computer to manage compute element images that support virtual network functions on compute elements in software defined networks, the computer-executable program instructions comprising computer-executable instructions to:
    install, by a network function virtualization (NFV) compute element, an image supporting at least one virtualized network function on the compute element, the image comprising instructions and data to initiate a Transmission Control Protocol (TCP) connection between the compute element and a Software Defined Network (SDN) controller over a network upon a reboot of the compute element;
    reboot the compute element after the install;
    establish, by the re-booted compute element as a TCP client in accordance with the instructions and using the data, a TCP connection with the controller over the network;
    accept, by the compute element as a cryptographic network protocol server, a cryptographic network protocol connection via the TCP connection from the controller as a cryptographic network protocol client in accordance with the instructions;
    accept, by the compute element as a network management protocol server, a network management protocol connection via the cryptographic network protocol connection from the controller as a network management protocol client in accordance with the instructions;
    receive, by the compute element from the controller over the network management protocol connection, network management commands regarding a status of the rebooted compute element; and
    transmit, by the compute element to the controller over the network management protocol connection, responses to the received commands in accordance with the instructions.

9. The computer program product of claim 8, wherein the cryptographic network protocol is a Secure Shell (SSH) cryptographic network protocol.

10. The computer program product of claim 8, wherein the cryptographic network protocol is a Blocks Extensible Exchange Protocol (BEEP) compliant cryptographic network protocol.

11. The computer program product of claim 8, wherein the network management protocol is a Network Configuration Protocol (NETCONF) network management protocol.

12. The computer program product of claim 11, wherein:
the received network management commands comprise a command to create a NETCONF remote procedure call (RPC) subscription for the controller with the compute element, and
transmitting responses to the received commands comprises transmitting responses in accordance with the RPC subscription.

13. The computer program product of claim 8:
wherein the controller is characterized by first Internet Protocol (IP) address for monitoring reachability of the compute element and a second IP address for image management, and wherein the data comprises the first IP address and the second IP address,
wherein establishing a TCP connection comprises establishing, by the rebooted compute element a first TCP connection for monitoring reachability with the first IP address, and a second TCP connection for monitoring image installation with the second IP address; and
wherein transmitting comprises transmitting reachability responses to the first IP address, and transmitting image installation responses to the second IP address.

14. The computer program product of claim 8, wherein the computer-executable program instructions further comprise computer-executable instructions to transmit, by the rebooted compute element to the controller, a public key certificate of the rebooted compute element including an IP address of the compute element, and
wherein at least one of the TCP connection, the cryptographic protocol connection, and the network management protocol connection are conditioned on an authentication of the rebooted compute element by the controller based on the public key certificate.

15. A system, comprising:
a storage device; and
a processor communicatively coupled to the storage device, wherein the processor executes application code instructions that are stored in the storage device to cause the system to:
install, by a network function virtualization (NFV) compute element, an image supporting at least one virtualized network function on the compute element, the image comprising instructions and data to initiate a Transmission Control Protocol (TCP) connection between the compute element and a Software Defined Network (SDN) controller over a network upon a reboot of the compute element;
reboot the compute element after the install;
establish, by the rebooted compute element as a TCP client in accordance with the instructions and using the data, a TCP connection with the controller over the network;
accept, by the compute element as a cryptographic network protocol server, a cryptographic network protocol connection via the TCP connection from the controller as a cryptographic network protocol client in accordance with the instructions;
accept, by the compute element as a network management protocol server, a network management protocol connection via the cryptograph network protocol connection from the controller as a network management protocol client in accordance with the instructions;
receive, by the compute element from the controller over the network management protocol connection, network management commands regarding a status of the rebooted compute element; and
transmit, by the compute element to the controller over the network management protocol connection, responses to the received commands in accordance with the instructions.

16. The system of claim 15, wherein the cryptographic network protocol is a Secure Shell (SSH) cryptographic network protocol.

17. The system of claim 15, wherein the cryptographic network protocol is a Blocks Extensible Exchange Protocol (BEEP) compliant cryptographic network protocol.

18. The system of claim 15, wherein the network management protocol is a Network Configuration Protocol (NETCONF) network management protocol.

19. The system of claim 18, wherein:
the received network management commands comprise a command to create a NETCONF remote procedure call (RPC) subscription for the controller with the compute element, and
transmitting responses to the received commands comprises transmitting responses in accordance with the RPC subscription.

20. The system of claim 15, further comprising:
transmitting, by the rebooted compute element to the controller, a public key certificate of the rebooted compute element including an IP address of the compute element, and
wherein at least one of the TCP connection, the cryptographic protocol connection, and the network management protocol connection are conditioned on an authentication of the rebooted compute element by the controller based on the public key certificate.

\* \* \* \* \*